2,337,832

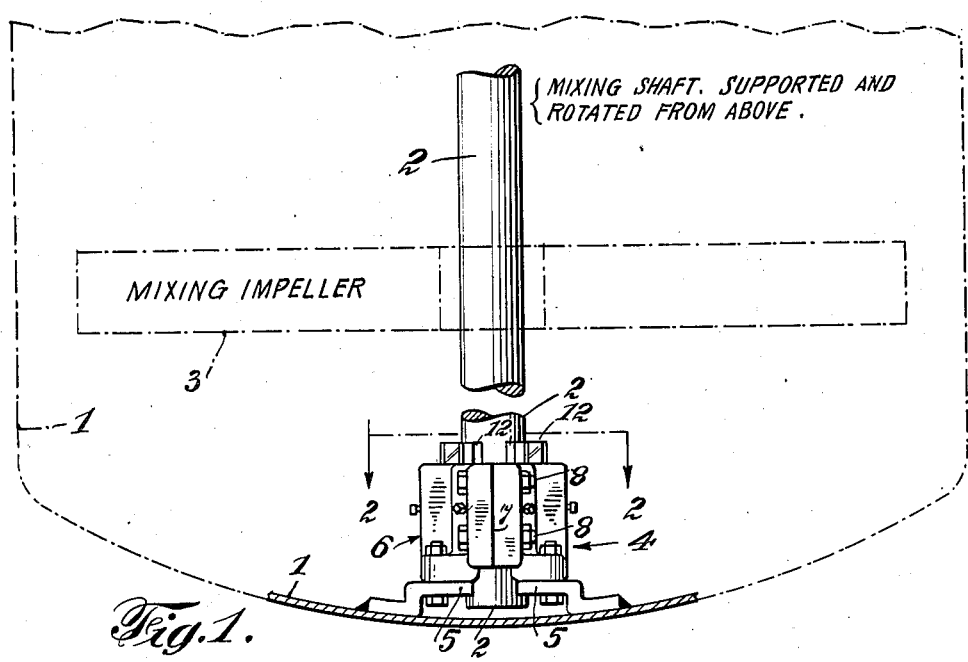
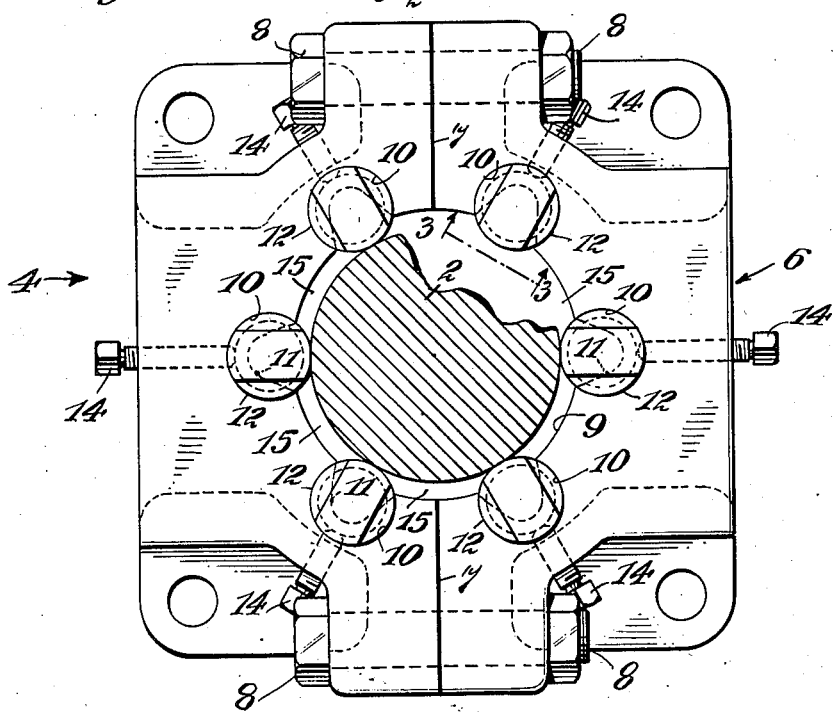

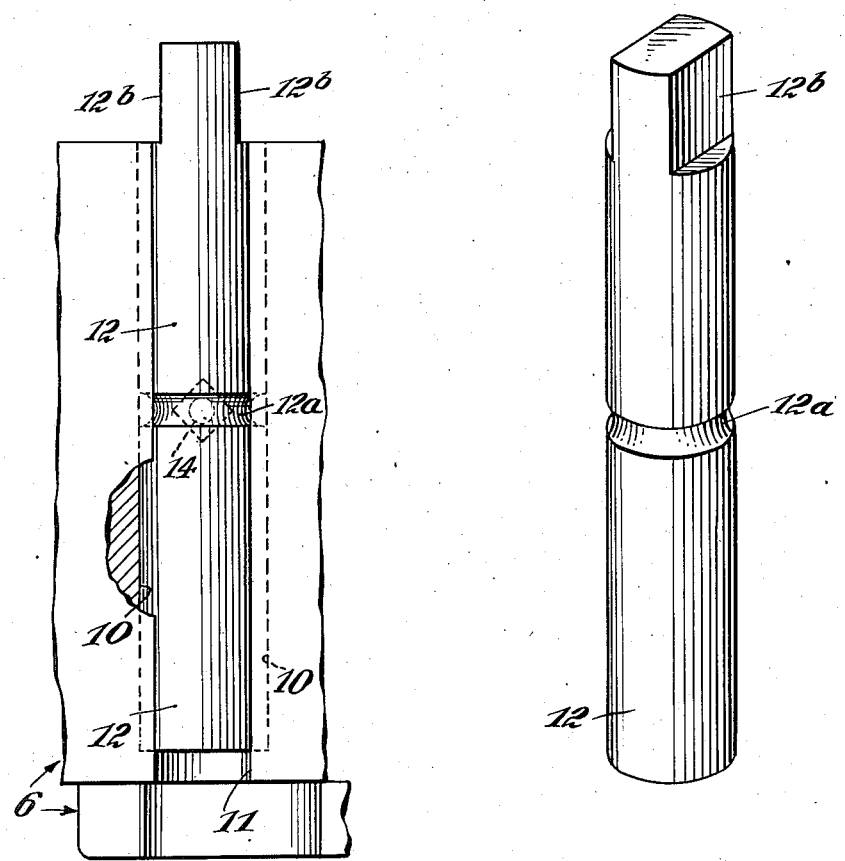
Fig. 3.
Fig. 4.
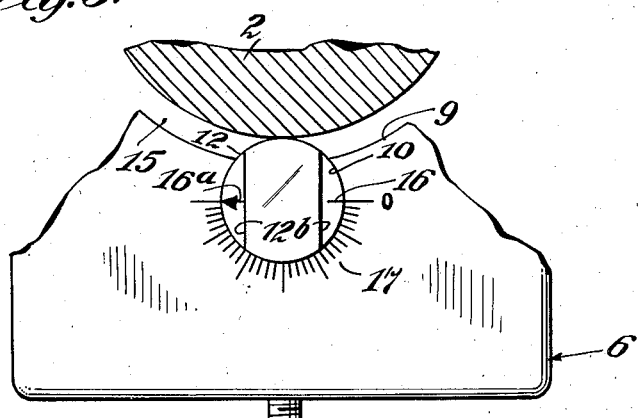
Fig. 5.
INVENTORS
James E. Moul
BY and Clayton H. Petry
Ramsey, Kent, Chisholm & Lutz
their ATTORNEYS Patented Dec. 28, 1943

UNITED STATES PATENT OFFICE 2,337,832

MIXING APPARATUS

James E. Moul, Scarsdale, and Clayton H. Petry, Bronx, N. Y., assignors to The Turbo-Mixer Corporation, New York, N. Y., a corporation of New York Application December 30, 1941, Serial No. 424,846

5 Claims. (Cl. 308—63)

This invention relates to mixing apparatus which, in the usual form, has a mixing shaft that depends within a tank, the shaft being supported and driven from the top. The invention is particularly applicable to such apparatus as may desirably, from a mechanical standpoint, include a shaft "steady bearing" submerged in the "mix."

Mixing apparatuses of this class are made in a wide range of sizes, and are used for mixing a wide variety of liquid and quasi-liquid substances (called the "mix"). In some cases the mixing shaft depends as much as thirty-five feet into the tank and carries from one to four mixing impellers; and each impeller may be a number of feet in diameter and may weigh as much as 1800 lbs., and occasionally more. To properly journal such a shaft without a bearing submerged in the mix is quite an undertaking, as it is not only difficult to perfectly balance the rotating weight, but it is impossible to arrange for perfectly balanced reactive forces imposed on the impellers by the mix. A particularly successful construction in which the mixing shaft is journaled solely at the top is shown in U. S. Patent to Petry 2,151,146.

With the construction shown in the Petry patent the mixing shaft must have sufficient rigidity to take care of the depending length of shaft and the unbalanced load that is imposed on the shaft. In some instances this means that the size of the mixing shaft, bearings, and drive are out of proportion to the power requirements of the installation. To illustrate, for rigidity a four-inch shaft may be required (with correspondingly large bearing and drive) when the necessary power requirements could be provided with a two-inch shaft (and correspondingly small bearing and drive).

The smaller shaft, etc., could be used if the shaft were provided with one or more "steady bearings" submerged in the mix. However, this has not been feasible in many cases, for various reasons, some of which will be mentioned.

Submerged bearings cannot be lubricated unless the mix itself lubricates them. In some mixes the bearings gall and deteriorate rapidly. Some mixes contain grit which rapidly wears the bearing out. Some mixes chemically attack the bearings, or set up electrolytic action in connection with them. Sometimes the precise chemical composition of the mix is unknown, and if a suitable bearing material existed, it could only be found by trial and error. Sometimes any metal-to-metal bearing is taboo because of the danger of sparking and resultant explosion, e. g., when gasoline is being handled by the apparatus.

In some apparatus the mixing shaft has been extended through the bottom of the tank and the "steady bearing" placed beneath the tank. This, however, provides for only one steady bearing and requires a stuffing box. Stuffing boxes present many of the difficulties of submerged bearings; and additionally the problem of leakage.

The general object of the present invention is to provide mixing apparatus with one or more submerged steady bearings which overcome many of the difficulties previously presented by submerged bearings.

Other objects of the invention are to provide mixing apparatus with submerged steady bearings that permit the use of a wide variety of bearing materials, that minimize abrasion from grit or the like in the mix, that provide for easy and repeated adjustment to compensate for wear, that provide for the use of even non-metallic and fragile materials as bearing materials, that provide for easy substitution of one bearing material for another, and that reduce the tendency of the bearings to gall.

Further objects of the invention are to provide mixing apparatus with steady bearings which can be economically manufactured, which can be easily installed, and which can be readily serviced.

Various additional and specific objects of the invention will be obvious to those skilled in the art from a consideration of the following disclosure.

Fig. 1 of the drawings is a largely diagrammatic vertical section showing mixing apparatus embodying the present invention.

Fig. 2 is an enlarged plan view of the steady bearing, with the shaft in section, the view being taken from the line 2—2 in Fig. 1.

Fig. 3 is a fragmentary vertical section taken in general on line 3—3 of Fig. 2.

Fig. 4 is an isometric view of one of several bearing pins that are included in the bearing.

Fig. 5 is a fragmentary top plan view showing a portion of the bearing, and showing in section a fragment of the shaft.

Depending within a mixing tank 1 is a mixing shaft 2 that carries one more mixing impeller such as the one indicated diagrammatically at 3. It will be understood that the shaft 2 is supported and driven from the top by any suitable means (not shown). Suitable supporting and driving means is shown in Patent 2,151,146 previously referred to. The lower end of the shaft is laterally supported by a steady bearing designated as a whole by 4. This bearing is preferably made with outside faces that may be bolted against various vertical or horizontal supports to mount the bearing. By way of illustration the bearing is shown bolted on top of horizontal supports 5, 5 that are secured to the bottom of tank 1. While only one steady bearing is shown, it will be understood that additional duplicate bearings may be placed at appropriate locations along the shaft.

The steady bearing has a housing, designated as a whole by 6, which may be split at 7 and bolted together by bolts such as 8. In some instances the housing may be made in one piece without splitting, but the split construction facilitates installation and removal of the bearing without disturbing impellers which may be on the shaft. At its center the housing has a vertical hole 9 pierced by the shaft 2 in spaced relation. Formed in housing 6 and spaced circumferentially about the hole 9 are a number of vertical sockets 10, for example six or eight. These sockets, which intersect the hole 9, are of cylindrical bore and extend from the top of the housing 6 to adjacent to the bottom of the housing. The bottom of each socket is provided with an inwardly extending horseshoe shaped rim 11.

Positioned in the sockets 10 are cylindrical bearing pins 12 which extend sidewise through the lateral openings in the sockets and make bearing contact with the shaft 2; and the expression "bearing contact" implies, of course, appropriate operating clearance in the set-up. The pins 12 are adapted to be held against rotation by set screws 14 which may advantageously seat in annular grooves 12a formed in the bearing pins. Each rim 11 forms a seat against which the bottom of the pin rests, but leaves space for insertion of a punch to drive the pin out of the socket in case it should become frozen.

It will be noted that the bearing pins make line contact with the shaft 2, leaving vertical spaces or channels 15 between them. Due to the small area of contact between the pins and the shaft, any tendency of the bearing to gall is minimized. Furthermore, any grit in the mix is readily wiped off the bearing pins and drops through the spaces 15, so that the abrasive action of grit in the mix is kept relatively small.

Upon wear taking place, the original bearing condition of pins 12 may be restored by slightly rotating the pins to bring a new radial part of the pins into contact with the shaft. This involves loosening and retightening of set screws 14. To facilitate such adjustment of the pins, their projecting top ends may be provided with flats or wrench faces 12b and the pins may be provided with indexes 13 and 16a (Fig. 5) cooperating with a scale 17 formed or marked on top of the housing 6. One such scale is shown in Fig. 5, and it will be understood that each of the pins is provided with like indexes and scale. As shown in Fig. 5, the scale is semi-circular, but the pin is provided with two diametrically opposite indexes. After adjustments enough have been made to advance index 16 entirely around the semi-circular scale, then further adjustments may be made by advancing index 16a entirely around the scale. Since only a slight change in the angular position of a pin is necessary to bring a new line of the pin into contact with the shaft, a great many tightenings of the bearing can be effected without replacement of the pins. Of course, when the pins become worn out they can be replaced with new ones.

The cylindrical form of the pin is one that can be readily obtained with various materials, even fragile materials. Thus the pins may not only be made of practically any metal, but they may also be made of non-metallic material such as rubber, hard rubber, "Bakelite," other synthetic molded materials, carbon, glass, ceramic, wood, fabric, etc. Also the housing 6 may be cast from a wide range of metals and it may be molded from "Bakelite," other synthetic materials, carbon, etc.

It will be apparent that the bearing provides for an extremely wide range of bearing materials. Thus, practically any material can be selected that is suitable from a chemical, abrasive, and electrolytic standpoint for the mix to be handled. Also, bearing pins of other materials can readily be substituted when the mix is changed to one of different character. In instances where a trial and error method has to be used to determine a suitable, or the best, bearing material, this can easily be done by successively replacing the pins with others of different materials. Also, since the bearing pins may be made of non-metallic materials, it is feasible to eliminate all metal-to-metal contact between the bearing and the shaft, to thereby eliminate the danger of sparking, with possible resultant explosion. The sockets 10 surround and support the pins to such an extent as render it quite feasible to make the pins of relatively frigile materials.

While only one steady bearing has been shown in the mixer disclosed, it will be apparent that like bearings may be used at intervals along the shaft.

In compliance with the patent statutes we have disclosed the best form in which we have contemplated applying our invention. It will be realized, however, that the invention may be embodied in various modified forms and, that therefore the disclosure is to be considered as illustrative rather than limiting.

What we claim is:

1. In mixing apparatus of the type in which a driven shaft extends vertically into a tank, and a steady bearing for the shaft is submerged in the mix; the improvement which comprises the steady bearing having: a housing surrounding the shaft in spaced relation thereto, circumferentially spaced vertical sockets formed in the housing, the sockets intersecting the space between the housing and the shaft, and stationary pins of circular cross section positioned in the sockets and making sidewise bearing contact with the shaft, the pins being circumferentially separated around the shaft and being adjustable in rotative position to bring new portions thereof into bearing contact with the shaft.

2. In mixing apparatus of the type in which a driven shaft extends vertically into a tank, and a steady bearing for the shaft is submerged in the mix; the improvement which comprises the steady bearing having: a housing surrounding the shaft in spaced relation thereto, circumferentially spaced vertical sockets formed in the housing, the sockets intersecting the space between the housing and the shaft, and readily replaceable stationary pins of circular cross section positioned in the sockets and making sidewise bearing contact with the shaft, the pins being circumferentially separated around the shaft and being adjustable in rotative position to bring new portions thereof into bearing contact with the shaft.

3. In mixing apparatus of the type in which a driven mixing shaft depends within a tank, and a steady bearing for the shaft is submerged in the mix; the improvement which comprises the steady bearing having: a housing surrounding the shaft in spaced relation thereto, a plurality of vertical sockets in the housing, the sockets having seats at their bottoms, and a plurality of stationary pins replaceably telescoped in the sockets and against the seats, the pins extending lengthwise of the shaft and making sidewise bearing contact with the shaft, and each seat having an opening for the insertion of a punch to drive the pin from the socket.

4. In mixing apparatus of the type in which a driven mixing shaft depends within a tank, and a steady bearing for the shaft is submerged in the mix; the improvement which comprises the steady bearing having: a housing surrounding the shaft in spaced relation thereto, and a plurality of stationary pins mounted in the housing, the pins extending lengthwise of the shaft and making sidewise bearing contact with the shaft, the pins being adjustable in rotative position to bring new portions thereof into bearing contact with the shaft, each pin being provided with an annular groove, and the housing being provided with a set screw engaging the pin in said groove.

5. In mixing apparatus of the type in which a driven mixing shaft depends within a tank, and a steady bearing for the shaft is submerged in the mix; the improvement which comprises the steady bearing having: a housing surrounding the shaft in spaced relation thereto, and a plurality of stationary pins mounted in the housing, the pins extending lengthwise of the shaft and making sidewise bearing contact with the shaft, the pins being adjustable in rotative position to bring new portions thereof into bearing contact with the shaft, each pin being of circular cross-section and having an annular groove, each pin being provided with an extension shaped to receive a wrench, the housing being provided with set screws engaging the pins in said grooves, and each pin and the housing being provided with cooperating scale-and-index for measurement of the rotative adjustment of the pin.

JAMES E. MOUL.
CLAYTON H. PETRY.